(12) United States Patent
Curlier et al.

(10) Patent No.: US 9,708,053 B2
(45) Date of Patent: Jul. 18, 2017

(54) DEVICE FOR SUPPLYING OIL UNDER PRESSURE TO A LINEAR ACTUATOR OF A TURBINE ENGINE

(71) Applicant: SNECMA, Paris (FR)

(72) Inventors: Augustin Curlier, Melun (FR); Gilles Alain Charier, La Grande Paroisse (FR)

(73) Assignee: SNECMA, Paris (FR)

( * ) Notice: Subject to any disclaimer, the term of this patent is extended or adjusted under 35 U.S.C. 154(b) by 294 days.

(21) Appl. No.: 14/536,954

(22) Filed: Nov. 10, 2014

(65) Prior Publication Data
US 2015/0139802 A1 May 21, 2015

(30) Foreign Application Priority Data
Nov. 20, 2013 (FR) ..................................... 13 61406

(51) Int. Cl.
| | |
|---|---|
| *B64C 11/38* | (2006.01) |
| *B64C 11/30* | (2006.01) |
| *F01D 7/00* | (2006.01) |
| *F01D 25/16* | (2006.01) |

(Continued)

(52) U.S. Cl.
CPC ............ *B64C 11/38* (2013.01); *B64C 11/306* (2013.01); *F01D 7/00* (2013.01); *F01D 25/16* (2013.01);
(Continued)

(58) Field of Classification Search
CPC ..... B64C 11/30; B64C 11/306; B64C 11/308; B64C 11/38; B64C 11/40;
(Continued)

(56) References Cited

U.S. PATENT DOCUMENTS

| | | | |
|---|---|---|---|
| 4,822,243 A | 4/1989 | Poucher | |
| 4,842,484 A * | 6/1989 | Johnson | B64C 11/306 415/130 |

(Continued)

FOREIGN PATENT DOCUMENTS

| | | |
|---|---|---|
| EP | 0 311 276 A2 | 4/1989 |
| GB | 2 189 554 | 10/1987 |
| WO | WO 2013/011225 A2 | 1/2013 |

OTHER PUBLICATIONS

French Preliminary Search Report issued Sep. 15, 2014 in French Application 13 61406, filed on Nov. 20, 2013 ( with English Translation of categories and Written Opinion).

*Primary Examiner* — Dwayne J White
*Assistant Examiner* — Sang K Kim
(74) *Attorney, Agent, or Firm* — Oblon, McClelland, Maier & Neustadt, L.L.P.

(57) ABSTRACT

A device for supplying oil under pressure to a linear actuator of a turbine engine, in which the actuator includes an internal fixed portion and an external movable portion and a regulating device for regulating and supplying oil to chambers of the actuator, is provided. The regulating device is mounted radially outside the movable portion of the actuator, and the fixed portion of the actuator includes on its upstream end portion oil passage channels of which the outlets open radially outwards. The device further includes an oil distribution ring which is mounted on the upstream end portion of the fixed portion and which includes internal conduits of which the inlets communicate with the outlets of the channels of the fixed portion and the outlets open axially downstream and are connected to the regulating device.

10 Claims, 7 Drawing Sheets

(51) Int. Cl.
  *F01D 25/18*   (2006.01)
  *F01D 25/24*   (2006.01)
  *F02C 7/06*    (2006.01)
  *F16H 57/04*   (2010.01)
  *B64D 27/00*   (2006.01)

(52) U.S. Cl.
  CPC ........... *F01D 25/162* (2013.01); *F01D 25/18* (2013.01); *F01D 25/246* (2013.01); *F02C 7/06* (2013.01); *F16H 57/04* (2013.01); *F16H 57/046* (2013.01); *F16H 57/0423* (2013.01); *B64D 2027/005* (2013.01); *F05D 2260/70* (2013.01); *Y02T 50/66* (2013.01)

(58) Field of Classification Search
  CPC ....... B64D 2027/005; F01D 7/00; F01D 7/02; F01D 25/16; F01D 25/162; F01D 25/18; F01D 25/246; F02C 7/06; F16H 57/04; F16H 57/0423; F16H 57/46; F05D 2260/70; Y02T 50/66
  See application file for complete search history.

(56) References Cited

U.S. PATENT DOCUMENTS

| | | | |
|---|---|---|---|
| 4,863,347 A | | 9/1989 | Trott et al. |
| 5,281,095 A | * | 1/1994 | Komura .................. B64C 11/30 416/147 |
| 2012/0070290 A1 | * | 3/2012 | Balk ....................... B64C 11/32 416/147 |
| 2012/0079808 A1 | * | 4/2012 | Glynn ...................... F01D 7/00 60/268 |
| 2012/0093652 A1 | * | 4/2012 | Belmonte ............... B64C 11/06 416/147 |
| 2013/0000313 A1 | * | 1/2013 | Udall ..................... F16L 39/04 60/772 |
| 2013/0052016 A1 | * | 2/2013 | Szymandera ......... B64C 11/308 416/128 |
| 2013/0078096 A1 | | 3/2013 | Couderc et al. |
| 2014/0186182 A1 | * | 7/2014 | Gallet .................. B64C 11/306 416/147 |

\* cited by examiner

DEVICE FOR SUPPLYING OIL UNDER PRESSURE TO A LINEAR ACTUATOR OF A TURBINE ENGINE

SUMMARY OF THE INVENTION

The present invention relates to a device for supplying oil under pressure to a linear actuator of a turbine engine, and a system of orientation of the pitch of the blades of a turbine engine propeller incorporating such a device.

PRIOR ART

In the preferred, but not exclusive, application of the invention the device with the orientation system is intended to be mounted in turbine engines with a pair of contra-rotating propulsion propellers or with a propfan ("open rotor" or "unducted fan" type). However, without departing from the scope of the invention it could also be mounted on any linear annular hydraulic actuator.

It may be recalled that a turbine engine of the open rotor type principally comprises, along a longitudinal axis and inside a cylindrical nacelle borne by the structure of the aircraft (such as the rear portion of the fuselage of an aeroplane), a "gas generator" portion and a "propulsion" portion (only the portion of the nacelle covering the gas generator is fixed whilst the nacelle portions in which the revolving housings are accommodated are rotary). The propulsion portion comprises the two coaxial and contra-rotating propellers, respectively upstream (front) and downstream (rear) which are mounted in rotary polygonal ring housings of the turbine engine and which are driven in rotation in opposite directions to one another, for example, by an appropriate mechanism driven by a power turbine situated at the outlet of the gas generator portion, with the propeller blades extending radially outside the nacelle.

In order to allow optimal operation of the turbine engine according to the different phases of flight which are encountered, the contra-rotating propeller blades can turn in the radial ring housings. For this, they are driven in rotation about their respective pivot axes, by an appropriate system of orientation which makes it possible to vary the setting of the blades in the course of flight, that is to say the pitch of the propellers. For example, the blades can vary according to the system, from +90° to 30° for the flight phases, from +30° to −30° for the phases on the ground and in reverse, and can have a rapid return to 90°, in the feathered position, in the event of malfunction in flight (engine failure), for which the blades are parallel with the forward direction of the aeroplane and offer the least possible drag.

A known system for orientation of the blades is described in the French patent application no. FR 11 58891 in the name of the applicant.

This system for orientation of the blades of a propeller comprises:
- a mechanism for fluid power control with a linear actuator centred on the longitudinal axis of the turbine engine and connected to a fixed housing supporting the propeller;
- a connection mechanism in order to transform the translation of the movable portion of the cylinder into a rotation of the blades in order to modify the pitch thereof, and comprising, for this purpose, a transfer bearing of which the internal ring is connected to the movable portion of the actuator, and a transmission means by connecting rods between the external ring of the bearing and the blades, and
- a means for lubrication of said transfer bearing.

As the movable portion of the actuator is displaced, the internal ring of the transfer bearing connected to the movable portion of the actuator follows the displacement and drives the external rotary ring via the contact of the rolling members, and pulls or pushes the connecting rods of the transmission means, which makes it possible to modify the setting angle of the blades which turn in their housings.

The lubrication means provides lubrication and cooling of the bearing continuously, regardless of the axial position of the actuator.

A technique developed by the applicant which allows optimal lubrication of the bearing is the subject matter of a French patent application FR 12 56140 and consists of routing the lubricating oil as far as the interior of the bearing, passing through the actuator.

In fact, the fixed portion of the actuator is connected to a fixed cylindrical structural housing by means of an annular collar, with sources for supplying oil under pressure coming from upstream to the housing for operation of the actuator, that is to say the supply of high pressure oil to the chambers thereof in order to cause the movable portion to slide, and the lubrication means to be supplied. However, the movable portion of the actuator, which is mounted around the fixed portion and connected by the bearing to the blade of the relevant propeller via a linkage system, is located on the rear outer side of the collar, opposite the front inner side of the collar into which the power supplies directed to the actuator flow. Consequently the problem arises of transferring the lubricant through the separation collar, in the present case from the interior towards the exterior thereof.

The French patent application FR 12 59207 in the name of the applicant provides a solution to the problem of connection and transfer of the lubricating oil from the source of supply or intake of the lubricant situated upstream to the movable portion, situated downstream, of the actuator in order to lubricate the bearing.

The chambers of the actuator are supplied with oil under pressure by regulating means which are connected to the means for feeding oil under pressure which are situated upstream of the collar. When the regulating means are situated inside the fixed portion of the actuator, the connection of these regulating means to the oil feeding means is relatively simple and may be of the type described in the application FR 12 59207.

However, there is currently no solution in order to provide this connection when the means for regulating oil under pressure are situated radially outside the fixed portion of the actuator.

The object of the present invention is to provide a simple and efficient solution to this problem, and in general to a problem of integration.

DESCRIPTION OF THE INVENTION

The invention proposes a device for supplying oil under pressure to a linear actuator of a turbine engine, this actuator comprising an internal fixed portion and an external movable portion and means for regulating and supplying oil to at least one chamber of the actuator in order to displace the movable portion on the fixed portion, characterised in that the regulating means are mounted radially outside the movable portion of the actuator, and in that the fixed portion of the actuator comprises at its upstream end portion oil passage channels of which the outlets open radially outwards, the device further comprising an oil distribution ring which is mounted on the upstream end portion of the fixed portion and which comprises internal conduits of which the inlets communicate with the outlets of the channels of the fixed portion and the outlets open axially downstream and are connected to the regulating means.

The present invention proposes a novel technology in which the regulating means are no longer mounted inside the fixed portion but outside the movable portion of the actuator. The connection of these regulating means, situated downstream of or behind the aforementioned collar, to the means for feeding oil under pressure, situated upstream of or in front of the collar, is carried out by means of a distribution ring of which the internal conduits communicate with internal channels of the upstream end portion of the fixed portion on which the ring is mounted. This ring is preferably removable. As in the prior art, the upstream end of the fixed portion of the actuator can be connected to the downstream end with the smaller diameter of a collar, for example substantially frustoconical, upstream of which the means for feeding oil under pressure run. The regulating means may be mechanical means intended to switch between the lines for supply and discharge of oil from the chambers of the actuator, in particular as a function of the axial position of the movable portion of the actuator and of an order given by the pilot of the aircraft, in particular depending on the flight condition. It is advantageous to mount the ring directly on the fixed portion of the actuator since this decreases or even eliminates the risks of misalignment of these parts in operation and thus improves the transfer of oil.

Advantageously, the ring comprises at least one radially external lug in which one of the aforementioned internal conduits is formed, the conduit being substantially L-shaped and comprising a downstream axial portion connected to an upstream radial portion communicating at its radially inner end with an outlet of a channel of the fixed portion. The ring may for example comprise two lugs of this type, each lug comprising an internal conduit.

The first of these lugs may be used to supply oil under pressure to the regulating means and the other lug may then be used for the discharge of the oil originating from the regulating means. In a variant, the two lugs serve to supply oil to the regulating means, the oil being discharged by means of another line passing for example radially inside the fixed portion of the actuator.

The device preferably comprises three lines for oil under pressure, two for the supply of oil (and the progression of the setting angle towards the abutment position of −30° for example—reverse) and one for the recovery of the oil (for the return of the blades to the feathered position at 90°). The supply of the chamber of the actuator that allows progression towards the abutment position of −30° can be performed by one or the other of the two supply lines depending on the axial position of the movable portion of the actuator. The two supply lines may likewise serve as drains in some operating phases.

In a preferred embodiment of the invention, one of the chambers of the actuator can be supplied by two discrete lines depending on the position of the actuator, and the other chamber can be supplied by a third line, each line serving also as a drain for the chamber to which it is connected when the other chamber is put under pressure. The two first lines may be connected to the chamber by an integrated mechanical regulation device (distributor).

The radial height or dimension of the lugs is preferably predetermined so that the outputs of their conduits are substantially aligned axially with the regulating means (or with simple hydraulic connectors; this can be extended to a hydraulic system which does not have an integrated mechanical regulation device) mounted outside the movable portion. The outlets of these conduits are preferably connected to first ends of longitudinal tubes of which the opposing ends are mounted so as to slide axially in the regulating means, in order to maintain the fluid connection to the regulating means during displacements of the movable portion of the actuator.

The channels of the fixed portion may be substantially L-shaped and each comprise a downstream radial portion aligned with the upstream radial portion of a conduit of the ring and connected to an upstream axial portion which opens at its upstream end onto an upstream radial face of an internal annular flange of the fixed portion.

This flange may serve for attaching the fixed portion to an annular flange of the aforementioned collar. As explained in the prior application FR 12 59207, the outlets of the means for feeding oil under pressure upstream of the collar can open onto the downstream face of the flange of the collar. The attachment of the flanges of the collar and of the fixed portion of the actuator provides fluid communication between the feeding means and the channels of the fixed portion, the axial portions of these channels being aligned axially with the outlets of the feeding means.

The upstream end portion of the fixed portion preferably comprises an external cylindrical surface for centering the ring on which the aforementioned outlets of the channels open, and which is connected at its downstream end to a cylindrical shoulder for axial abutment of the ring. The upstream end of the fixed portion may comprise an external screw thread of a nut for clamping the ring on the fixed portion.

The upstream end portion of the fixed portion may comprise means co-operating by complementarity of shapes with corresponding means of the ring in order to lock said ring in rotation with respect to the fixed portion.

The aforementioned cylindrical surface of the fixed portion comprises for example radial bosses which are engaged in recesses of complementary shape on the ring. Each channel of the fixed portion can open radially onto one of these bosses. These bosses constitute locating means preventing incorrect mounting of the ring on the fixed portion.

Sealing means may be mounted between the ring and the upstream end portion of the fixed portion. Preferably, an O-ring is mounted around each communication interface between a channel of the fixed portion and a conduit of the ring. Each seal is for example accommodated in an annular groove in the fixed portion which opens radially outwards and extends around the outlet of a channel of the fixed portion.

The regulating means are preferably mounted between the movable portion and a cylindrical support sleeve of a bearing which is connected to this movable portion. The sleeve may be radially spaced from the movable portion in order to create a space for housing the regulating means.

The space for housing the regulating means can likewise receive means for lubrication of the bearing which are supplied with lubricating oil by the passages of the ring which can, like the conduits, each be formed in an external radial lug of the ring.

The present invention also relates to a system for orientation of the pitch of the blades of a turbine engine propeller, comprising a control mechanism with an actuator connected to a side of a fixed structural cylindrical housing of the turbine engine, a movement transfer bearing connected to the movable portion of the actuator, a transmission means between the bearing and the blades in order to drive the rotation of the blades following the translation of the bearing, and means for feeding oil under pressure situated on the other side of the housing, characterised in that the feeding means are connected to the actuator by means of a device such as is described above.

The present invention also relates to an aircraft turbine engine, characterised in that it comprises a device or a system as described above.

BRIEF DESCRIPTION OF THE DRAWINGS

The invention will be better understood, and other details, characteristics and advantages thereof will be more clearly apparent from a reading of the following description given by way of example and with reference to the accompanying drawings, in which.

DETAILED DESCRIPTION

FIGS. 1 to 5 derive from the prior application FR 12 59207 in the name of the applicant and are described below by way of prior art.

Figure 1:
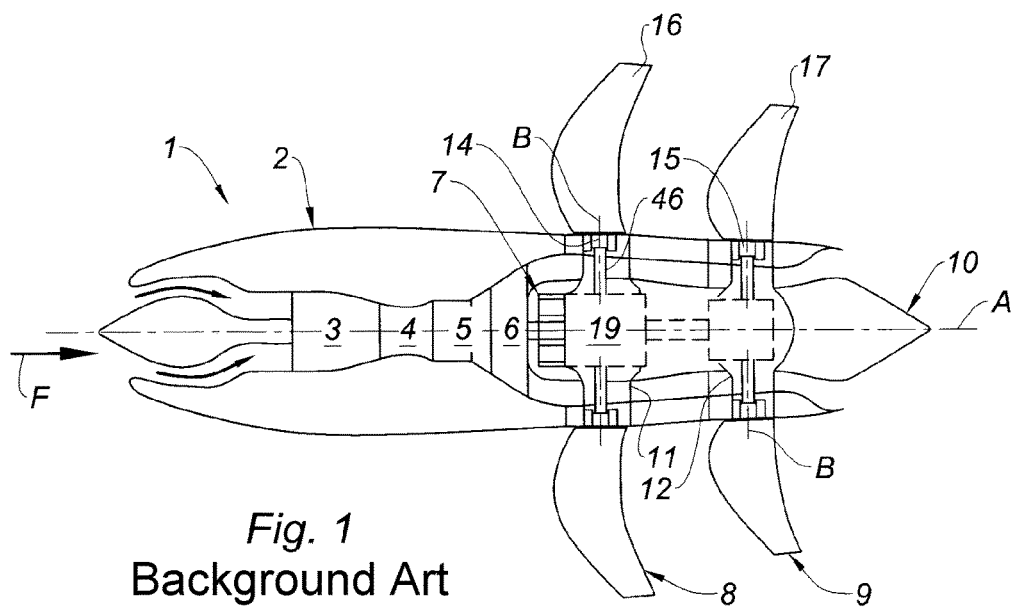
FIG. 1 is a schematic view, in axial section, of a turbine engine with a pair of contra-rotating propellers downstream of the gas generator, incorporating a system for orientation of the pitch of the blades for at least one of the propellers of the fan.

As FIG. 1 shows schematically, the turbine engine 1 with a propfan ("open rotor"), of longitudinal axis A, conventionally comprises, from top to bottom according to the flow direction of the gas stream F inside a nacelle 2 of the turbine engine, one or two compressors 3 depending upon the architecture of the gas generator with a single or double spool, an annular combustion chamber 4, a high-pressure turbine or two turbines at high pressure and at intermediate pressure 5 depending on said architecture, and a low-pressure turbine 6 which drives, in this example with a "geared" open rotor, by a reduction gear mechanism or planetary gear train housing 7 and in a contra-rotating manner, two upstream 8 and downstream 9 propellers according to the direction of the flow F, aligned coaxially along the longitudinal axis A of the turbine engine in order to constitute the fan. A pipe 10 terminates the turbine engine in the conventional manner. In another open rotor "direct drive" example, the rotary housings of the propellers are driven directly by two turbines of which the directions of gyration are opposed, and the invention can adapt to these two types of open rotor technology.

The propellers are disposed in radial parallel planes, perpendicular to the axis A, and turn by means of the turbine 6 and the reduction gear 7 in opposing directions of rotation. They are mounted in rotary housings 11, 12 with a polygonal ring around which the root 14, 15 of the blades 16, 17 are mounted.

Moreover, the upstream 8 and downstream 9 propeller blades are of the variable-pitch type, that is to say that they can be oriented around their radial pivot axes B by virtue of a controllable system of orientation of the pitch of the blades, in such a way that they take up a desired optimal angular position according to the operating conditions of the turbine engine and the flight phases concerned (rotation of the blades in the two directions with increasing and decreasing propeller angles, and return of the blades to the feathered position in the event of malfunction). In the present description, only the system of orientation 19 of the blades associated with the upstream propeller 8 will be described. The downstream propeller 9 may be equipped with a system for orientation of the blades similar to that set out below in connection with the upstream propeller.

Figure 2:
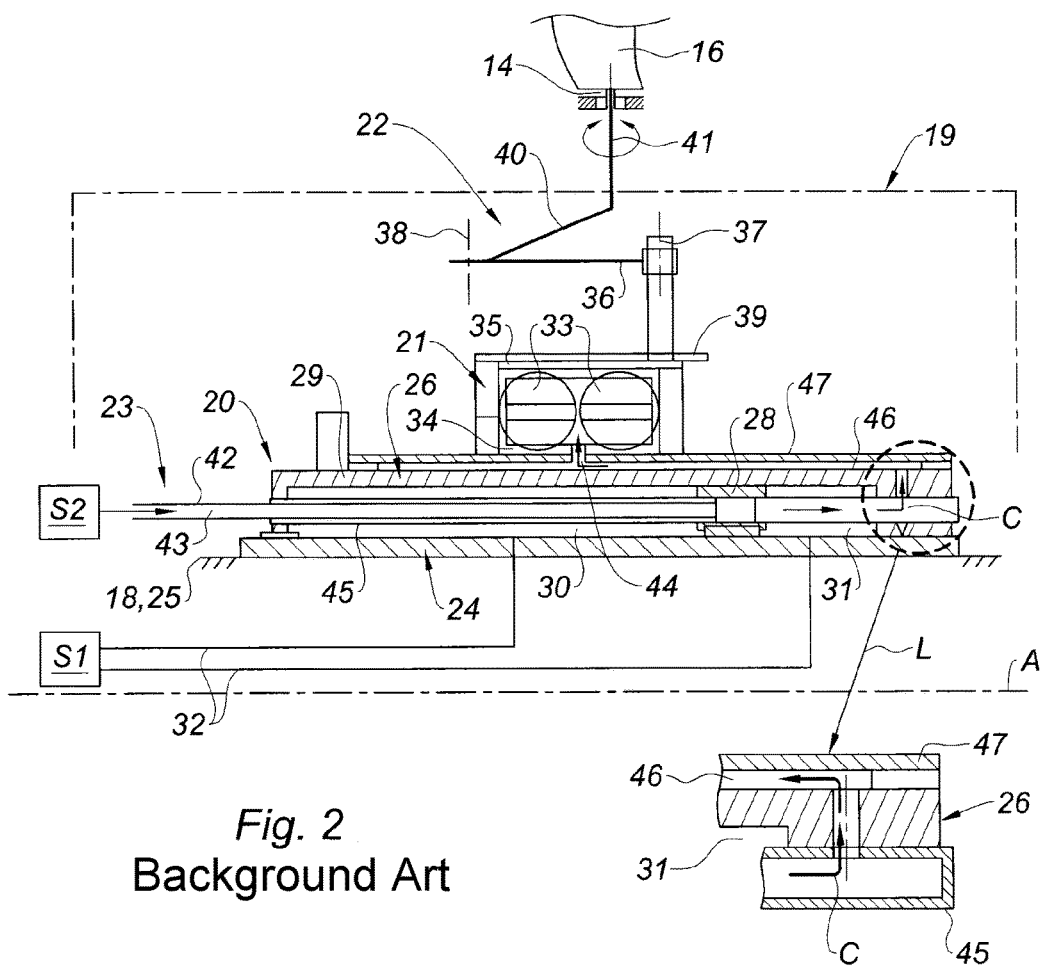
FIG. 2 shows schematically, in axial half cross-section, the system for orientation of the pitch of the blades and of the actuator for control of this system.
Figure 3:
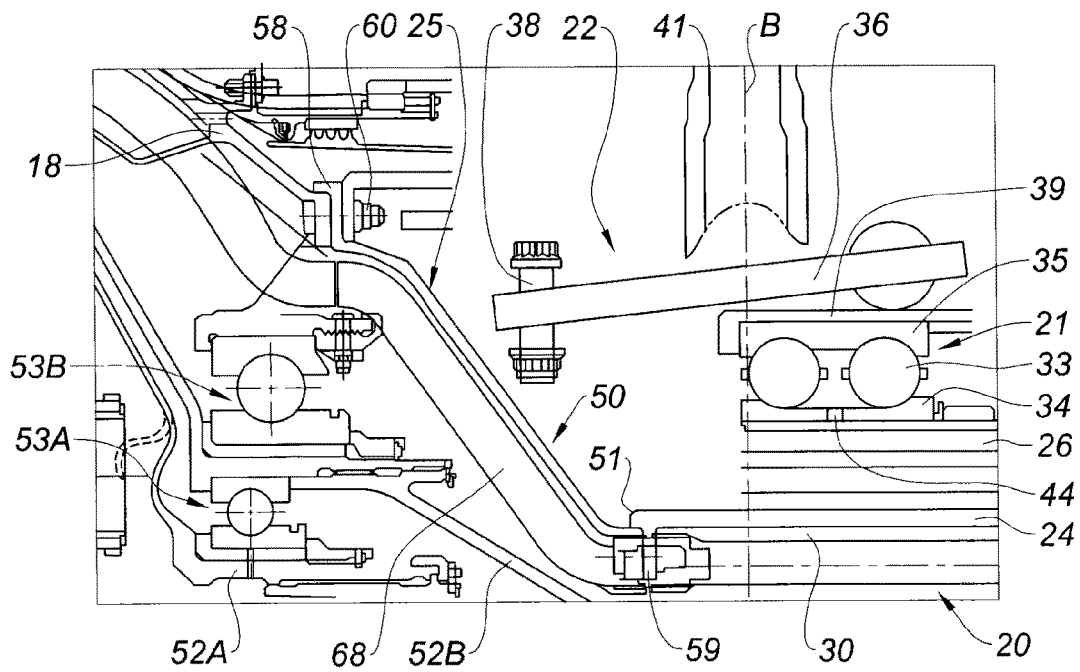
FIG. 3 shows a collar for connection between the fixed structural housing of the turbine engine and the fixed portion of the actuator.

To this end, as FIGS. 1 to 3 show, the system 19 for orientation of the blades of the upstream propeller comprises a linear displacement actuator 20 such as a cylinder centred on the axis A, a movement transfer bearing 21, a transmission means 22 and a means of lubrication 23 of the bearing.

In particular, the cylinder 20 is annular, since it is disposed around coaxial shafts (not shown) of the turbine engine 1. It comprises a cylindrical fixed portion 24 connected to the structural housing 18 by being connected thereto by means of a collar 25 of a lubricant transfer device 50. The annular movable portion 26 serving as an external sliding rod of the cylinder is located around the internal cylindrical fixed portion of the cylinder 20. Thus this movable portion or rod 26 can be moved axially by the action of a fluid coming from a controllable fluid supply source of the cylinder, symbolised by S1 in FIG. 2.

This fixed portion 24 comprises a piston 28 along which the side wall 29 of the movable portion 26 may slide with sealing and which delimits two opposing chambers of variable volume 30, 31. These two chambers, also sealed, are connected by supply/discharge lines or pipes 32 to the controllable fluid source S1, such as oil under pressure. Thus depending upon the supply pressure transmitted to the cylinder 20 by one of the pipes, the movable portion 26 can slide between two end positions defined by minimum and maximum fluid volumes in the two opposing chambers. The lines 32 constitute means for regulating oil under pressure to the chambers 30, 31, which in this case are mounted radially inside the fixed portion 24 of the actuator.

The transfer bearing 21, which in this example is a double row ball bearing 33 of which the internal ring 34 is fixed around the rod 26 of the cylinder by being connected thereto in translation, is mounted around the external and movable annular rod 26 of the cylinder, as shown schematically in FIG. 2. The external ring 35 of the ball bearing is mounted in a cylindrical platform 39 in conjunction with the transmission means 22 in order to ensure the angular rotation of the blades.

For this purpose, this transmission means 22 (FIG. 2, 3) comprises a plurality of connecting rods 36, identical in number to the blades, and distributed at equal angles relative to one another around the cylinder, substantially vertically above said cylinder. The connecting rods 36 are connected, by one of their ends and the platform, to the external ring 35 of the ball bearing by axes of articulation symbolised as 37 in FIG. 2, substantially parallel to the axes B of the blades. The other ends of the connecting rods are connected, around axes of articulation 38 parallel to the preceding ones, to substantially transverse crank pins 40 provided at the end of the rotary radial shafts 41 which extend the roots 14 of the blades 16, along the axis B. It will therefore be understood that, as the rod 26 of the cylinder is displaced (in one direction or the other), the internal ring 34 of the ball bearing 21 connected to the rod drives the external ring 35 by contact with the balls 33, and pulls on the connecting rods 36, making it possible to modify the setting angle of the blades.

At any moment the lubrication means 23 supplies oil for the lubrication and cooling of the ball bearing 21. It advantageously comprises, in the embodiment of FIG. 2 (with its enlarged detail L) and 3, a plurality of rods or pipes 42 of which the internal passage 43 is intended for routing of the lubricant. The rods 42 are, on one side, connected to a source supply of lubricant S2, and, on the other side, introduced into the movable portion or annular rod 26 of the cylinder in order to feed the lubricant along an internal route C (FIG. 2) to the bearing. This technique is described in detail in the French patent application No. FR 12 56140 in the name of the applicant.

The lubricant passes through radial holes 44 provided in the internal ring 34 and penetrates into the ball bearing 21, and depending upon whether the injection rods 42 of the lubrication means 23 pass through the wall 29 of the sliding portion, through the anti-rotation guide rods 45 between the fixed and movable portions (FIG. 2), or directly through the annular cavity 46 situated under the support sleeve 47 of the ball bearing if this sleeve is sufficiently raised with respect to the movable portion 26 of the cylinder.

The object of the lubricant transfer device 50 is to allow the lubricant to change from supplying the source S2 which runs, in this case inside the fixed structural housing 18 and the collar 25, to the movable portion 26 of the cylinder supporting the bearing, outside the collar, said collar physically separating the supply of lubricant (inside the housing) from the (exterior) movable portion that has a bearing.

Figure 4:
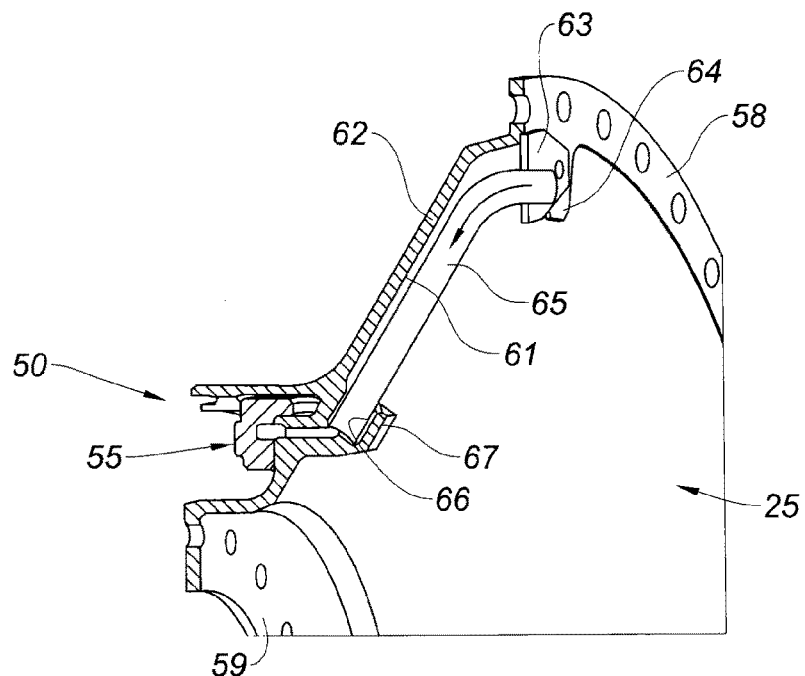
FIG. 4 is a partial perspective view of the collar.

The device 50 comprises the collar 25 and a lubricant transfer ring 55 associated with the collar and visible in FIG. 4. In order to allow the connection between the fixed housing 18 and the front end 51 of the fixed portion of the cylinder, the annular collar 25 has a frustoconical shape attached by its large base to the housing 18 and by its small base to the cylinder. The supply/discharge lines 32 coming from the source S1 supply the power to the chambers of the cylinder for sliding the movable portion according to the operating phases of the turbine engine and run along the interior of the wall of the collar 25 in order to connect to the front end 51 of the fixed portion 24 of the cylinder. Concentric rotary shafts 52A, 52B (shown partially) respectively of the downstream propeller and of the upstream propeller, are also supported by ball bearings 53A (situated between the two shafts) and 53B (situated between the upstream propeller shaft and the fixed housing).

The ring 55 is intended to collect the lubricant originating from the incoming supply source S2 situated on the inside of the housing and the collar, then to distribute the lubricant collected into outlets for routing the lubricant outside the collar and corresponding, in the example, to the injection rods 42 of the lubrication means 23 in order to feed it via the cavity 46 between the movable body 26 and the support sleeve 47 in the direction of the bearing 21.

The annular collar 25 has a frustoconical shape and has the upstream exterior clamping flange 58 for connection to the fixed structural housing 18, and the downstream interior clamping flange 59 for connection to the control mechanism 20, in this case the fixed portion of the cylinder. Connection members (bolts) 60 are used for clamping.

Figure 5:
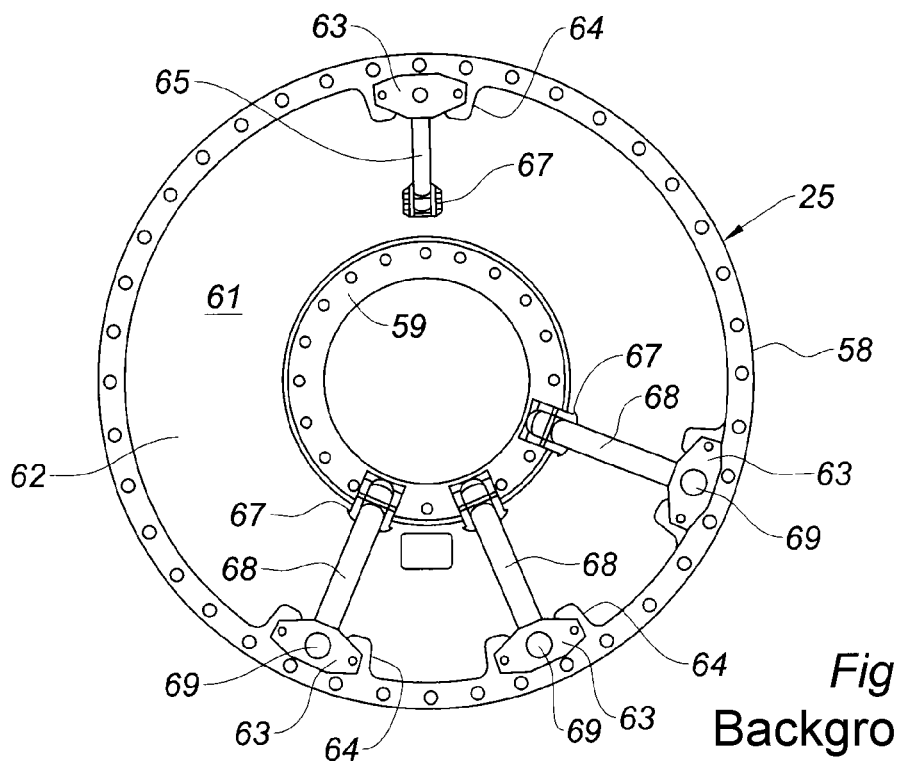
FIG. 5 is a front view of the collar.

With reference to FIGS. 4 and 5, it can be seen that close to the exterior flange 58, on the side of the front face or upstream face 61 of the wall 62 of the collar, there is a support 63 arranged on a retaining tab 64 of the collar 25 in order to receive the end of a pipe 65 of which the other end engages, with sealing, in the hole 66 of a boss 67 close to the interior flange 59. Thus, the pipe 65 radially follows the frustoconical wall 62 of the collar, extending along the front face thereof 61. At the end of the pipe 65 connected to the support 63, the incoming supply S2 of lubricant is connected with sealing. In the base of the boss 67 an axial hole is pierced, passing through the thickness of the wall 62 of the collar, and leading into the internal cavity 56 of the device 50, so as to feed the oil into the cavity. The hole is pierced from the rear side of the collar in order to open into the base of the hole 66 of the boss 67 of which the wall prevents piercing from the front face of the collar.

Figure 6:
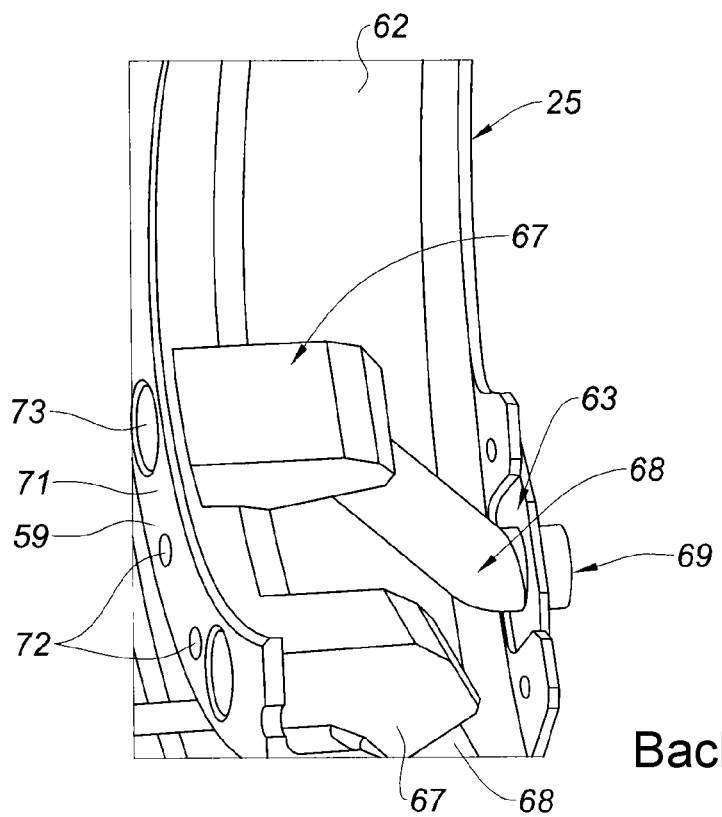
FIG. 6 is a partial schematic view in perspective of the means for feeding oil under pressure which extend in front of the collar.

Moreover, as FIGS. 5 and 6 show, three other pipes 68 are provided along the wall 62 of the collar 25. They are connected to the source S1 by supply lines (not shown) connected to one of their ends 69, these ends 69 carry supports 63 attached to tabs 64 of the collar situated near its exterior upstream flange 58. Their opposing ends 70 are mounted in bosses 67 on the upstream radial face of the interior downstream flange 59 of the collar for the supply to the chambers 30, 31 of the cylinder 20 to control the orientation of the blades.

As can be seen in FIG. 6, the oil outlets 73 of the pipes 68 open axially downstream on the downstream radial face 71 of the flange 59, between orifices 72 for the passage of bolts for attaching this flange. The connection of the ends 69 of the pipes 68 to the supply lines for oil under pressure is made automatically when the collar 25 is mounted on the structural housing 18.

FIGS. 7 to 15 show the technology according to the invention.

Figure 7:
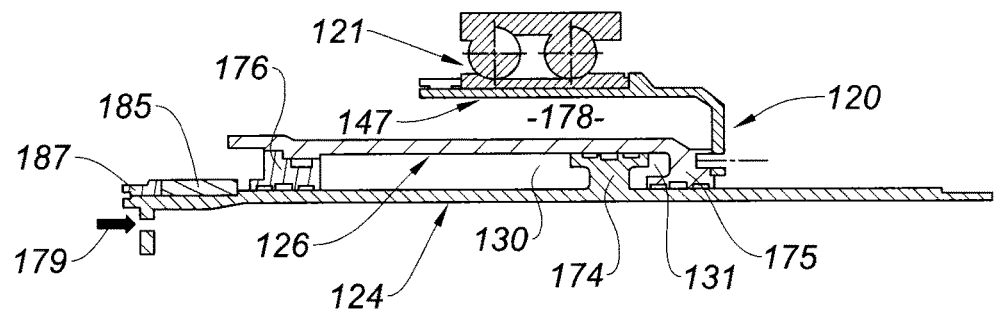
FIG. 7 is a schematic half-view in axial section of an actuator and of a transfer bearing for a system for orientation of the pitch of blades according to the invention.
Figure 8:
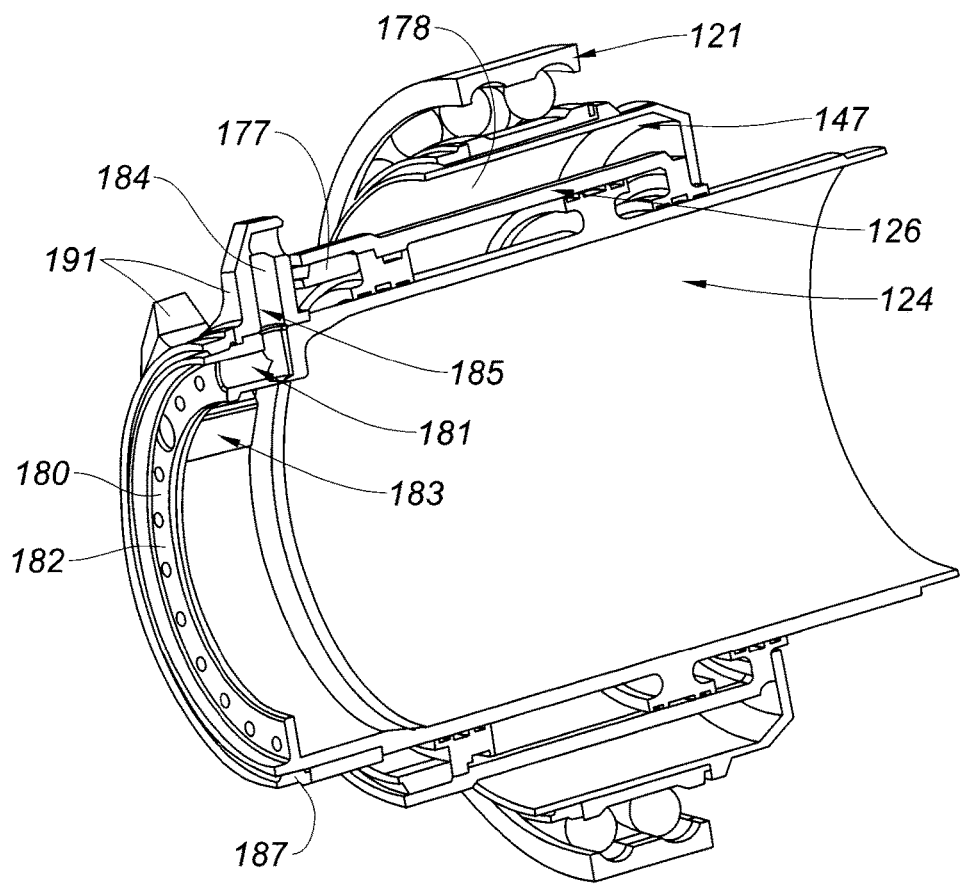
FIG. 8 is a schematic view in axial section and in perspective of a device according to the invention for supplying oil under pressure to the actuator of the orientation system.
Figure 9:
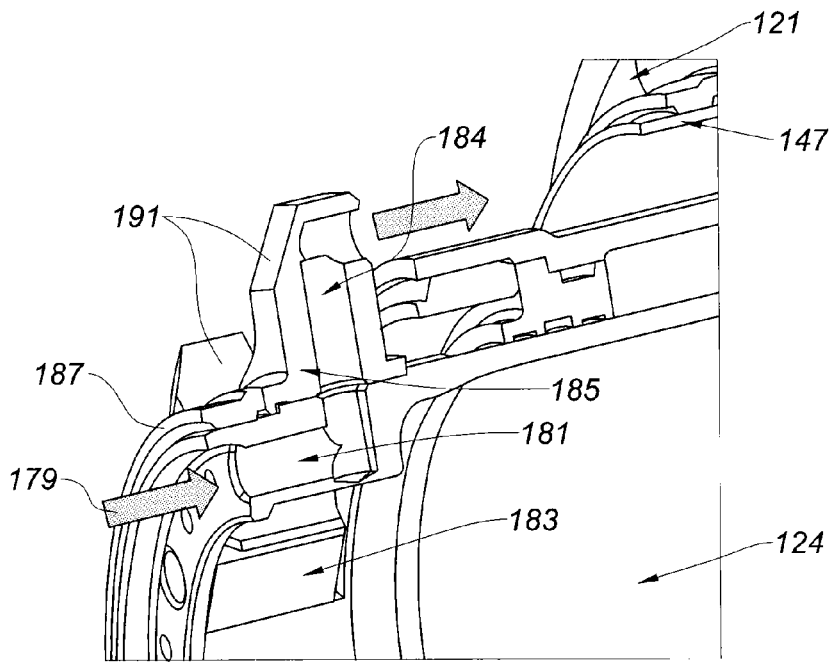
FIG. 9 is an enlarged view of a portion of FIG. 8.

The actuator 120 shown in FIGS. 7 to 9 is similar to that described in the foregoing and comprises a fixed internal portion 124 surrounded by a movable external portion, these portions 124, 126 being substantially cylindrical. The internal portion 124 comprises a radially external annular rib 174 of which the external periphery serves for centering and guiding the movable portion 126. The movable portion comprises on its downstream end an internal annular rim 175 of which the internal periphery co-operates with the external cylindrical surface of the fixed portion 124. A ring 176 is interposed radially between the upstream end of the movable portion 126 and the external cylindrical surface of the fixed portion 124, this ring being connected to the movable portion by screwing a nut 177 (FIG. 8) onto an internal thread of the upstream end of the movable portion 126.

When the movable portion 126 of the actuator is displaced on the fixed portion 124, the ring 176 and the rim 175 slides on the external surface of the fixed portion and the rib slides on the internal cylindrical surface of the movable portion. The ring 176 and the rib 174, on the one hand, and the rib 174 and the rim 175, on the other hand, delimit sealed chambers 130, 131 intended to be supplied with oil under pressure in order to control the displacement of the movable portion on the fixed portion.

The movable portion 126 is surrounded by a cylindrical sleeve 147 which defines with the movable portion an annular space 178 for mounting means for regulating and supplying oil under pressure to the chambers 130, 131 of the actuator 120. The sleeve 147 serves as support for the transfer bearing 121 described in the foregoing.

The arrow 179 of FIG. 7 designates the intake of oil under pressure delivered by the pipes 68 situated in front of the collar 25. This oil is delivered inside the fixed portion 124 of the actuator. The present invention makes simple connection possible from this intake to the regulating means housed in the space 178.

The fixed portion 124 of the actuator comprises at its upstream end an internal annular flange 180 for fixing to the flange 59 of the collar 25. The flange 180 comprises openings aligned with the openings 72 of the flange 59 for the passage of the fixing bolts of these flanges. The upstream end portion of the fixed portion 124 also comprises internal channels 181 for circulation of oil under pressure, these channels 181 being substantially L-shaped and comprising an upstream axial portion of which the upstream end opens on the upstream radial face 182 of the flange 180 and of which the downstream end is connected to the radially internal end of a radial portion of which the radially external end opens radially outwards. The channels 181 are formed in bosses 183 on the internal cylindrical surface of the fixed portion 124 of the actuator.

Oil under pressure originating from the pipes 68 circulates in the channels 181 of the fixed portion 124 then penetrates into internal conduits 184 of a distribution ring 185 mounted on the upstream end portion of the fixed portion 124. The ring 185 is mounted removably on an external cylindrical surface 186 (FIG. 12) of the fixed portion 124, which comprises at its upstream end an external thread for screwing a nut 187 (FIG. 9) for clamping the ring 185 on a cylindrical shoulder 188 of the fixed portion, in order to immobilise the ring axially on the fixed portion.

The channels 181 of the fixed portion are connected automatically to the outlets 73 of the pipes 68 when the flanges 59, 180 are mounted.

Figure 11:
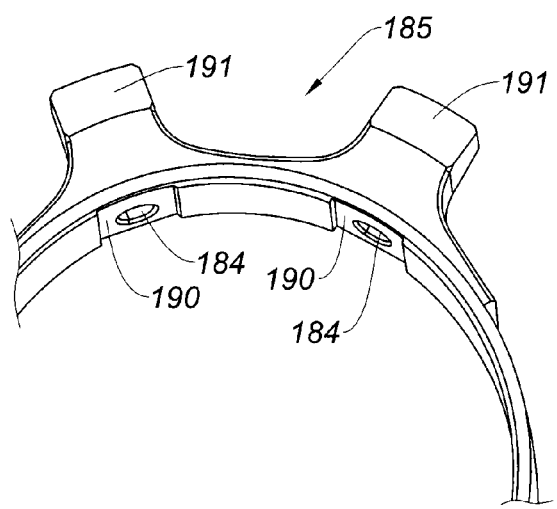
FIG. 11 is a partial schematic perspective view of an embodiment of the distribution ring of the device.
Figure 12:
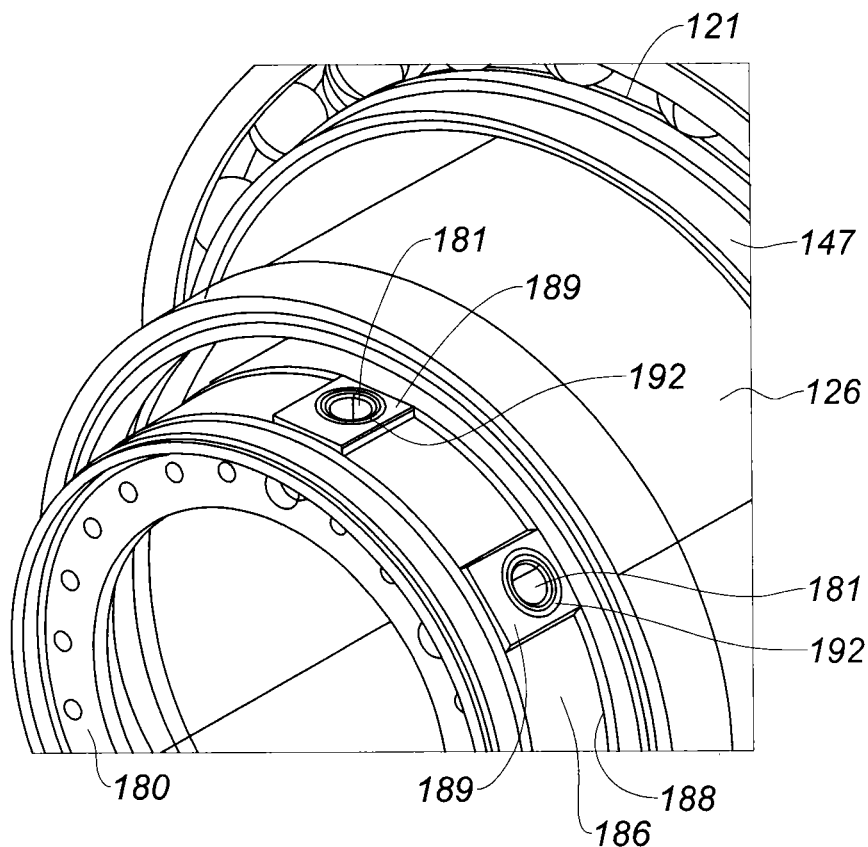
FIG. 12 is a partial schematic perspective view of the actuator.

The ring 185 is also immobilised in rotation on the fixed portion by complementarity of shapes. In the example shown, the cylindrical surface 186 of the fixed portion 124 comprises external bosses 189 of substantially parallelepipedic shape, which are intended to be engaged and to co-operate with the ring 185 (FIGS. 11 and 12).

The outlets of the internal channels 181 of the fixed portion 124 open on the radially external ends of the bosses 189 and are aligned radially with the inlets of the internal conduits 184 of the ring, which open at the base of the aforementioned recesses 190. The radially external ends of the bosses 189 each comprise an external annular groove which extends around the outlet of the corresponding channel 181 and in which is mounted an O-ring seal (not shown) which is intended to be clamped radially between the base of the groove and the base of a corresponding recess 190 of the ring 185.

The conduits 184 are substantially L-shaped and comprise an upstream radial portion of which the radially external end is connected to the upstream end of an axial portion of which the downstream end opens axially downstream in order to form the outlets of the conduits.

As can be seen in FIGS. 8 to 11, the conduits 184 are formed in radially external lugs (or turrets) 191. The ring 185 in this case comprises two lugs 191 and therefore two channels 184 but could comprise more of them, as will be described in greater detail below.

The outlets of the internal conduits 184 of the lugs 191 of the ring are substantially aligned axially with the regulating means housed in the space 178. The regulating means are connected to the movable portion 126 of the actuator and are therefore driven in translation during the displacement of the movable portion on the fixed portion 124.

Figure 13:
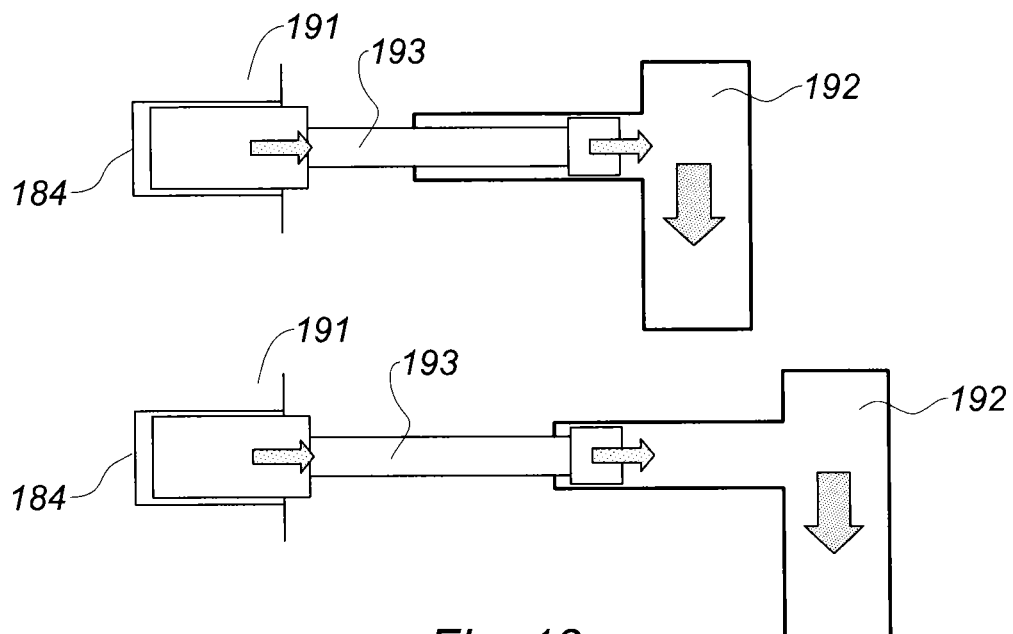
FIG. 13 shows schematically tubes for connecting the oil outlets of the distribution ring to the regulating means of the device.
Figure 14:
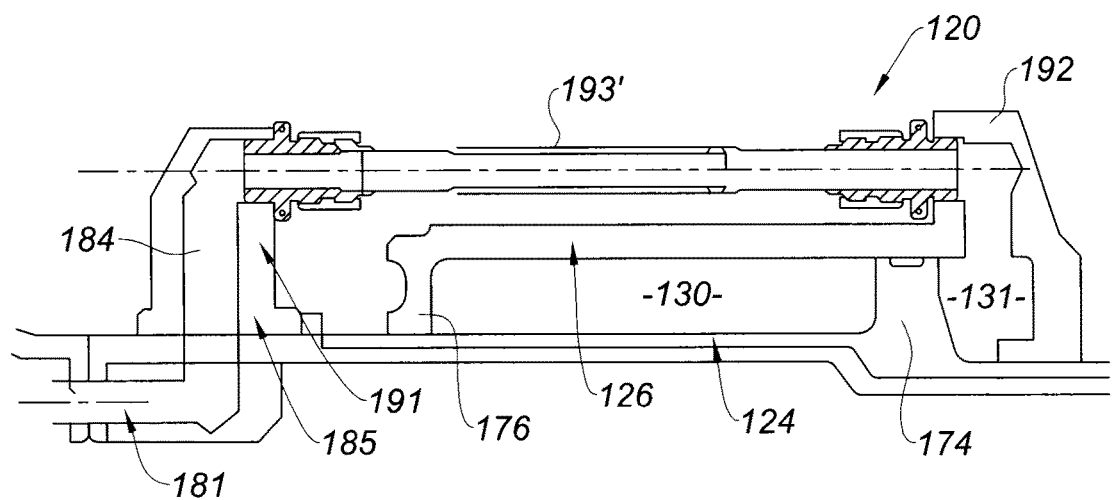
FIG. 14 is a schematic half-view in axial section of the actuator according to the invention.

As shown in FIGS. 13 and 14, the outlets of the internal conduits 184 of the lugs 191 of the ring 185 are connected to the regulating means 192 by longitudinal tubes 193. In the case of FIG. 13, the upstream end of each tube 193 is engaged in the downstream axial portion of a conduit 184 and its downstream end is mounted so as to slide in the regulating means 192. This type of mounting, which allows a supply of oil under pressure, regardless of the position of the movable portion on the fixed portion of the actuator, is known to the person skilled in the art and described in particular in the prior application FR 12 56140. In the case of FIG. 14, each tube 193' comprises two coaxial portions mounted so as to slide one inside the other. An upstream portion of the tube 193' has its upstream end fixed to a sleeve engaged in the downstream axial portion of a conduit 184 and its downstream end is mounted so as to slide in the upstream end of the downstream portion of the tube, of which the downstream end is fixed to another sleeve engaged in the regulating means 192.

In the example described above, the ring 185 comprises only two external lugs 191 although three pipes 68 are mounted in front of the collar 25 for the passage of the power oil. In fact, one of these pipes 68 is intended to be connected directly to a chamber of the actuator by a line passing radially inside the fixed portion 124 of the actuator.

Figure 10:
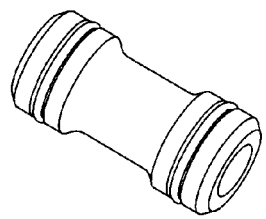
FIG. 10 is a schematic perspective view of an end piece for fluid communication.

FIG. 10 shows a cylindrical end piece which can be used in particular for the connection of the internal channels 181 of the fixed portion 124 to the outlets of pipes 68, and of the internal conduits 184 of the ring to the tubes 193. The ends of these end pieces are engaged in the aforementioned elements and have O-ring seals.

This variant is advantageous in order to limit the stresses in the tubes 193 (subject to buckling) for connection of the conduits 184' of the lugs 191' to the regulating means 192 (compensating for possible misalignments between these elements), during displacements of the movable portion of the actuator. The bore 196 of the ball joint 195 may comprise an internal thread for screwing an end of the corresponding tube 193.

Figure 15:
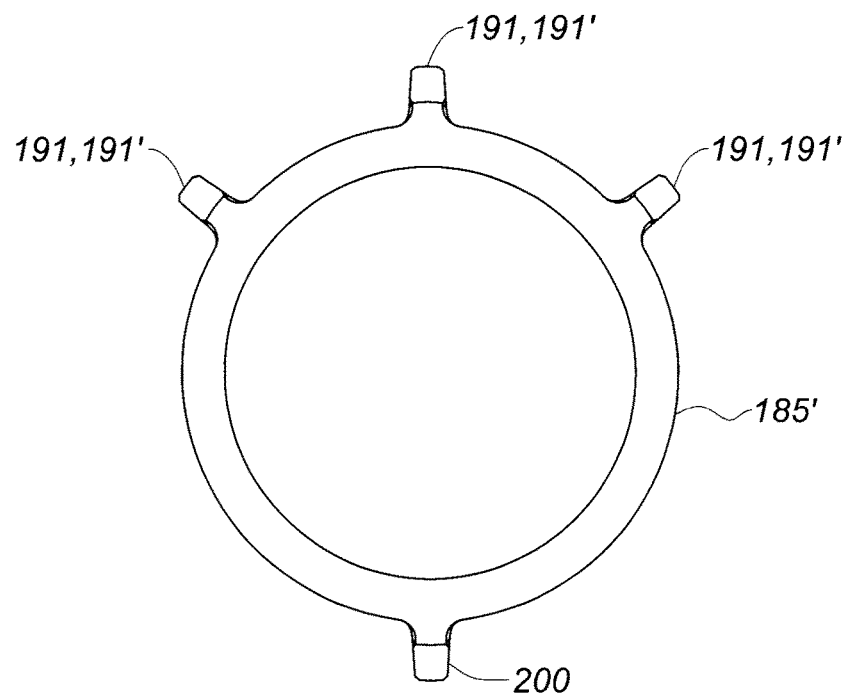
FIG. 15 is a very schematic view of a ring according to another variant.

FIG. 15 shows very schematically a variant of the ring 185'. This ring comprises three lugs 191, 191' comprising internal conduits for circulation of oil under pressure intended to be connected to the regulating means. These lugs 191, 191' have angular positions which are imposed by those of the outlets 73 of the pipes 68 mounted in front of the collar 25 (FIGS. 5 and 6). Two of these lugs serve for the supply of oil to the regulating means and the other lug serves for the discharge of the oil from these regulating means.

The ring 185' also comprises a lug 200 comprising an internal passage for circulation of lubricating oil. This internal passage may be supplied with lubricating oil by the pipe 65 described in the foregoing (FIG. 5). However, to do this said pipe must be longer than the pipe of the prior art and its mounting boss 67 must be situated in the region of the flange 59 of the collar, that is to say on the same circumference as the bosses 67 of the other pipes 68. The fixed portion of the actuator must also comprise at its upstream end at least one supplementary internal channel for connection between the outlet of the pipe 65 and the inlet of the internal passage of the lug 200, as described in the foregoing. The outlet of the internal passage of this lug 200 can be connected to the lubrication means of the bearing 121, which may be mounted with the aforementioned regulating means in the space 178.

The device according to the invention is assembled outside the engine, so that at the time of the final assembly, the only connections that need to be connected in order to have a functional system are those situated in the region of the connection flange upstream of the device. This operation is carried out blind.

The present invention is not limited to a hydraulic device in which a rotary load transfer system is incorporated.

The invention claimed is:

1. A device for supplying oil under pressure to a linear actuator of a turbine engine, the actuator comprising an internal fixed portion and an external movable portion and a regulator which regulates and supplies oil to at least one chamber of the actuator in order to displace the movable portion on the fixed portion,
    wherein the regulator is mounted radially outside the movable portion of the actuator, and an upstream end portion of the fixed portion of the actuator comprises oil passage channels, and outlets of the oil passage channels open radially outwards,
    the device further comprises an oil distribution ring which is mounted on the upstream end portion of the fixed portion and which comprises internal conduits, inlets of the internal conduits communicate with the outlets of the oil passage channels of the fixed portion, and outlets of the internal conduits open axially downstream and are connected to the regulator.

2. The device according to claim 1, wherein the oil distribution ring comprises at least two radially external lugs in each of which one of the internal conduits is formed, each internal conduit being substantially L-shaped and comprising a downstream axial portion connected to an upstream radial portion communicating at a radially inner end thereof with one of the outlets of one of the oil passage channels of the fixed portion.

3. The device according to claim 2, wherein the oil passage channels of the fixed portion are substantially L-shaped and each comprise a downstream radial portion aligned with the upstream radial portion of one of the conduits of the oil distribution ring, and connected to an upstream axial portion which opens at an upstream end of the upstream axial portion onto an upstream radial face of an internal annular flange of the fixed portion.

4. The device according to claim 1, wherein the upstream end portion of the fixed portion comprises an external screw thread of a nut for clamping the oil distribution ring on the fixed portion.

5. The device according to claim 1, wherein a shape of the upstream end portion of the fixed portion is complementary to a shape of the oil distribution ring in order to lock the oil distribution ring in rotation with respect to the fixed portion.

6. The device according to claim 1, wherein a seal is mounted between the oil distribution ring and the upstream end portion of the fixed portion.

7. The device according to claim 1, wherein the regulator is mounted between the movable portion and a cylindrical support sleeve of a bearing, which is connected to the movable portion.

8. The device according to claim 7, wherein the upstream end portion of the fixed portion comprises lubricating oil passage channels, outlets of the lubricating oil passage channels open radially outwards,
    wherein the oil distribution ring comprises internal passages, inlets of the internal passages open radially inwards and communicate with the outlets of the lubricating oil passage channels, and outlets of the internal passages open axially downstream for the supply of oil to the bearing.

9. A system for orientation of the pitch of the blades of a turbine engine propeller, comprising:
    a control mechanism with an actuator connected to a first side of a fixed structural cylindrical housing of the turbine engine,
    a movement transfer bearing connected to the movable portion of the actuator,
    a transmission device between the bearing and the blades in order to drive the rotation of the blades following the translation of the bearing, and
    an oil supply which supplies oil under pressure situated on a second side of the housing,
    wherein the oil supply is connected to the actuator by the device according to claim 1.

10. An aircraft turbine engine comprising a device according to claim 1.

* * * * *